US012341212B2

(12) United States Patent
Panosian et al.

(10) Patent No.: US 12,341,212 B2
(45) Date of Patent: Jun. 24, 2025

(54) ONE-HANDED POWER-TOOL BATTERY EJECTION APPARATUS

(71) Applicants: Michael H Panosian, Irvine, CA (US); Joshua M Keeler, Irvine, CA (US)

(72) Inventors: Michael H Panosian, Irvine, CA (US); Joshua M Keeler, Irvine, CA (US)

(*) Notice: Subject to any disclaimer, the term of this patent is extended or adjusted under 35 U.S.C. 154(b) by 0 days.

(21) Appl. No.: 18/404,960

(22) Filed: Jan. 5, 2024

(65) Prior Publication Data

US 2024/0234907 A1  Jul. 11, 2024

Related U.S. Application Data

(60) Provisional application No. 63/437,701, filed on Jan. 8, 2023.

(51) Int. Cl.
*B23B 45/00* (2006.01)
*H01M 50/247* (2021.01)
*H01M 50/262* (2021.01)
*B25F 5/00* (2006.01)

(52) U.S. Cl.
CPC ......... *H01M 50/262* (2021.01); *B23B 45/001* (2013.01); *H01M 50/247* (2021.01); *B23B 45/00* (2013.01); *B23B 2260/024* (2013.01); *B23B 2260/098* (2013.01); *B25F 5/00* (2013.01); *H01M 2220/30* (2013.01)

(58) Field of Classification Search
CPC .. B25F 5/00; B25F 5/02; B25F 5/006; H01M 50/24; H01M 50/244; H01M 50/247; H01M 50/202; H01M 50/213; B23B 45/00; B23B 45/001

USPC ...................... 173/170, 171, 217; 310/47, 50
See application file for complete search history.

(56) References Cited

U.S. PATENT DOCUMENTS

| | | | | |
|---|---|---|---|---|
| 5,148,094 | A * | 9/1992 | Parks | H02J 7/0045 320/110 |
| 6,204,632 | B1 * | 3/2001 | Nierescher | H02J 7/0013 320/113 |
| 6,615,930 | B2 * | 9/2003 | Bongers-Ambrosius | B23Q 1/0009 173/198 |
| 6,621,246 | B2 * | 9/2003 | Kubale | B25F 5/02 320/112 |
| 6,656,626 | B1 * | 12/2003 | Mooty | B27B 9/00 429/100 |
| 7,540,335 | B2 * | 6/2009 | Andriolo | B25F 5/02 173/42 |
| 2003/0071598 | A1 * | 4/2003 | Kubale | B25F 5/02 320/107 |
| 2003/0201738 | A1 * | 10/2003 | Yamamoto | B25F 5/02 318/139 |
| 2004/0160212 | A1 * | 8/2004 | Mastaler | B25F 5/02 320/115 |
| 2005/0058890 | A1 * | 3/2005 | Brazell | B25F 5/006 429/97 |

(Continued)

*Primary Examiner* — Scott A Smith
(74) *Attorney, Agent, or Firm* — ARJOMAND LAW GROUP; Farjam Majd

(57) ABSTRACT

Devices and mechanisms are disclosed for a simple ejection of the battery-pack from a power-tool with one hand only. The disclosed lock and release mechanisms primarily use one finger while the same hand of the user holds the power-tool. The claimed devices and mechanisms accept and eject two categories of batteries that either slideably attach to the bottom of the power-tool or are inserted into the handle of the power-tool.

20 Claims, 11 Drawing Sheets

(56) References Cited

U.S. PATENT DOCUMENTS

| | | | |
|---|---|---|---|
| 2006/0091852 A1* | 5/2006 | Watson | H02J 7/00043 320/114 |
| 2006/0222931 A1* | 10/2006 | Lin | B25F 5/02 429/97 |
| 2011/0147031 A1* | 6/2011 | Matthias | B25F 5/02 173/171 |
| 2017/0279095 A1* | 9/2017 | Reese | B25F 5/02 |
| 2020/0215679 A1* | 7/2020 | Tamura | B25F 5/02 |
| 2022/0045399 A1* | 2/2022 | Hennesy | H01M 50/264 |
| 2022/0288766 A1* | 9/2022 | Murui | H01M 50/213 |
| 2024/0234907 A1* | 7/2024 | Panosian | H01M 50/247 |
| 2024/0234910 A1* | 7/2024 | Panosian | H01M 50/264 |

\* cited by examiner

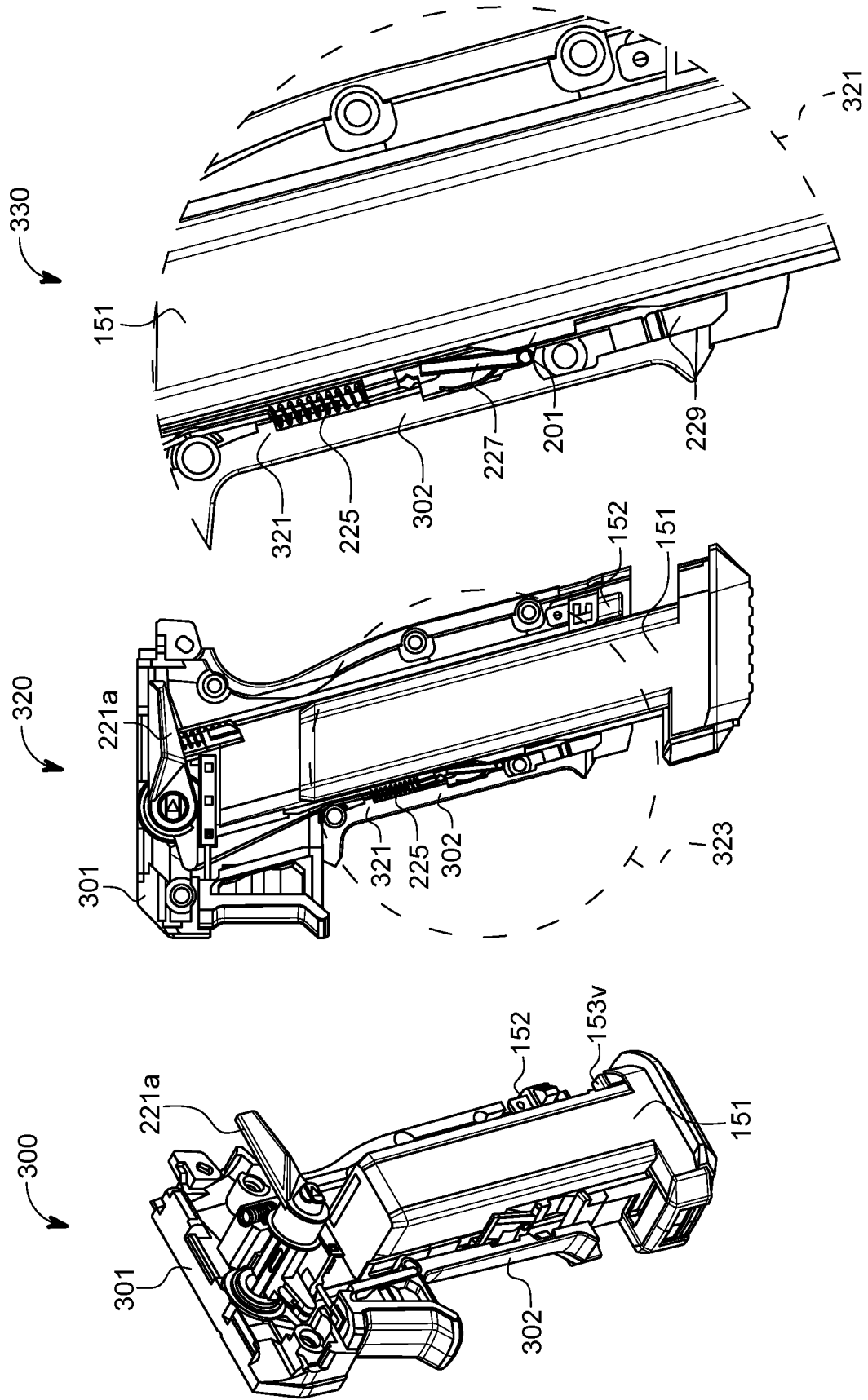

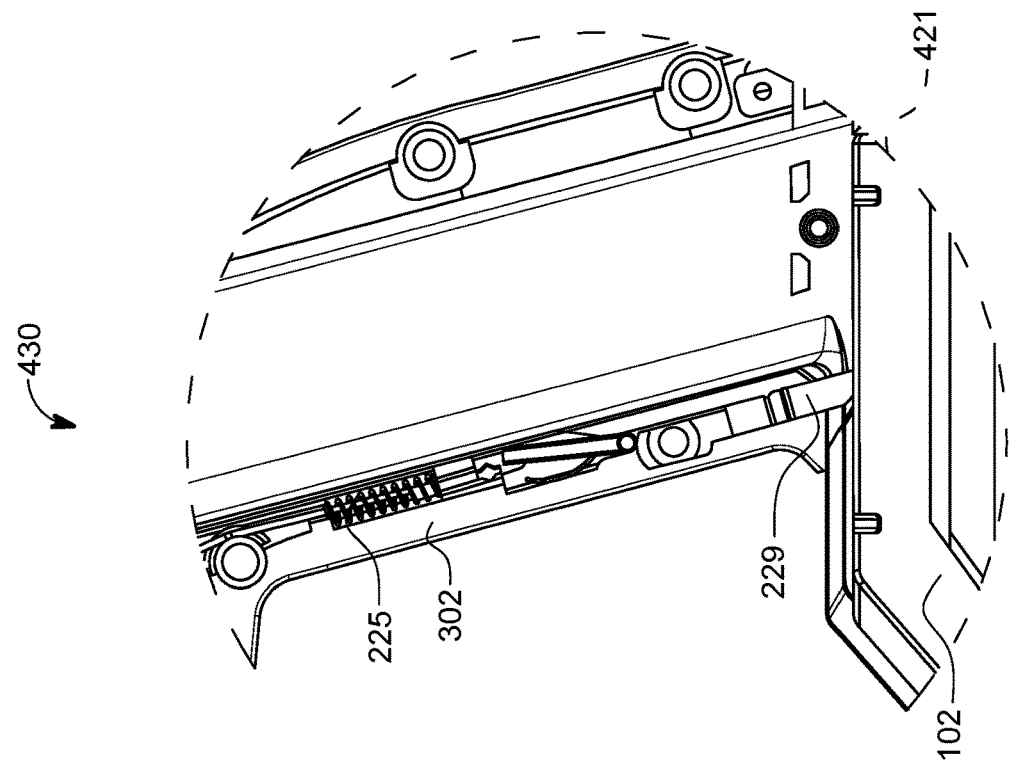
FIG. 4C
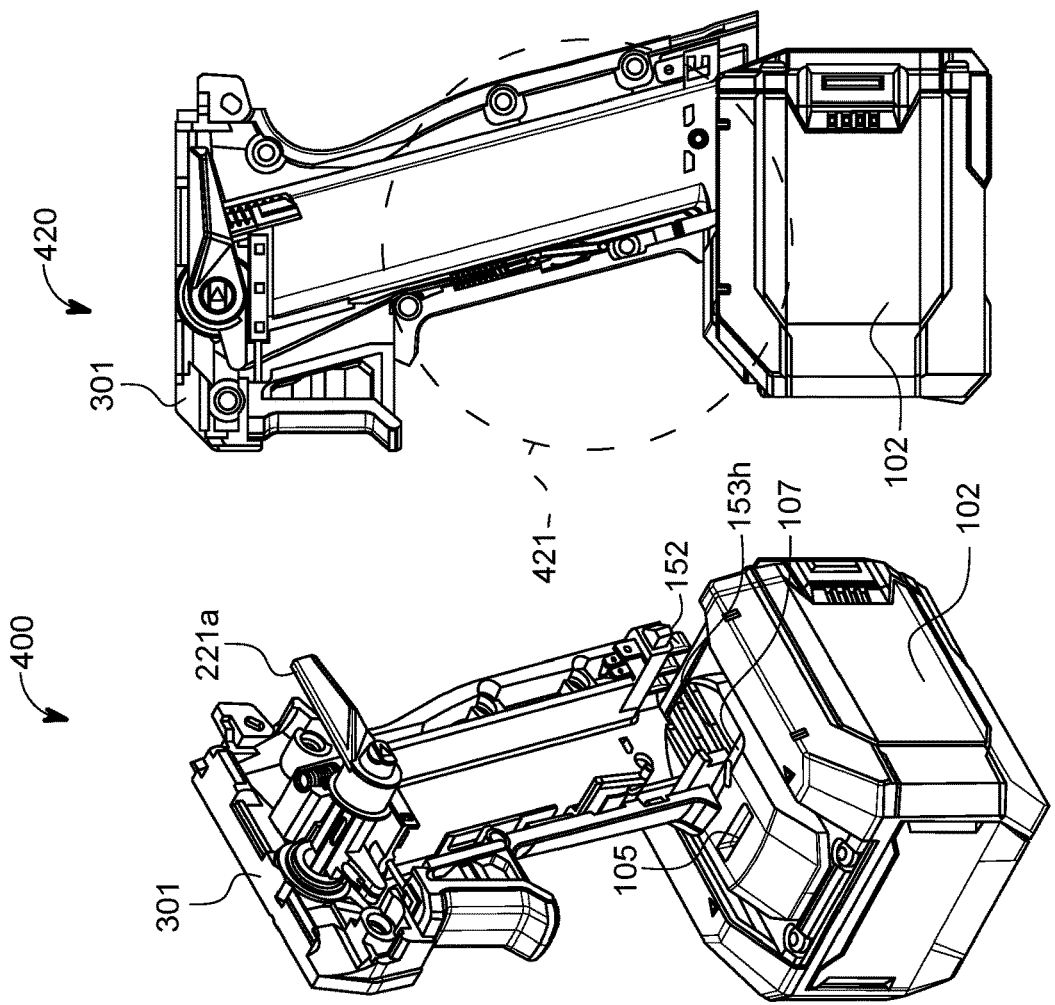
FIG. 4B
FIG. 4A

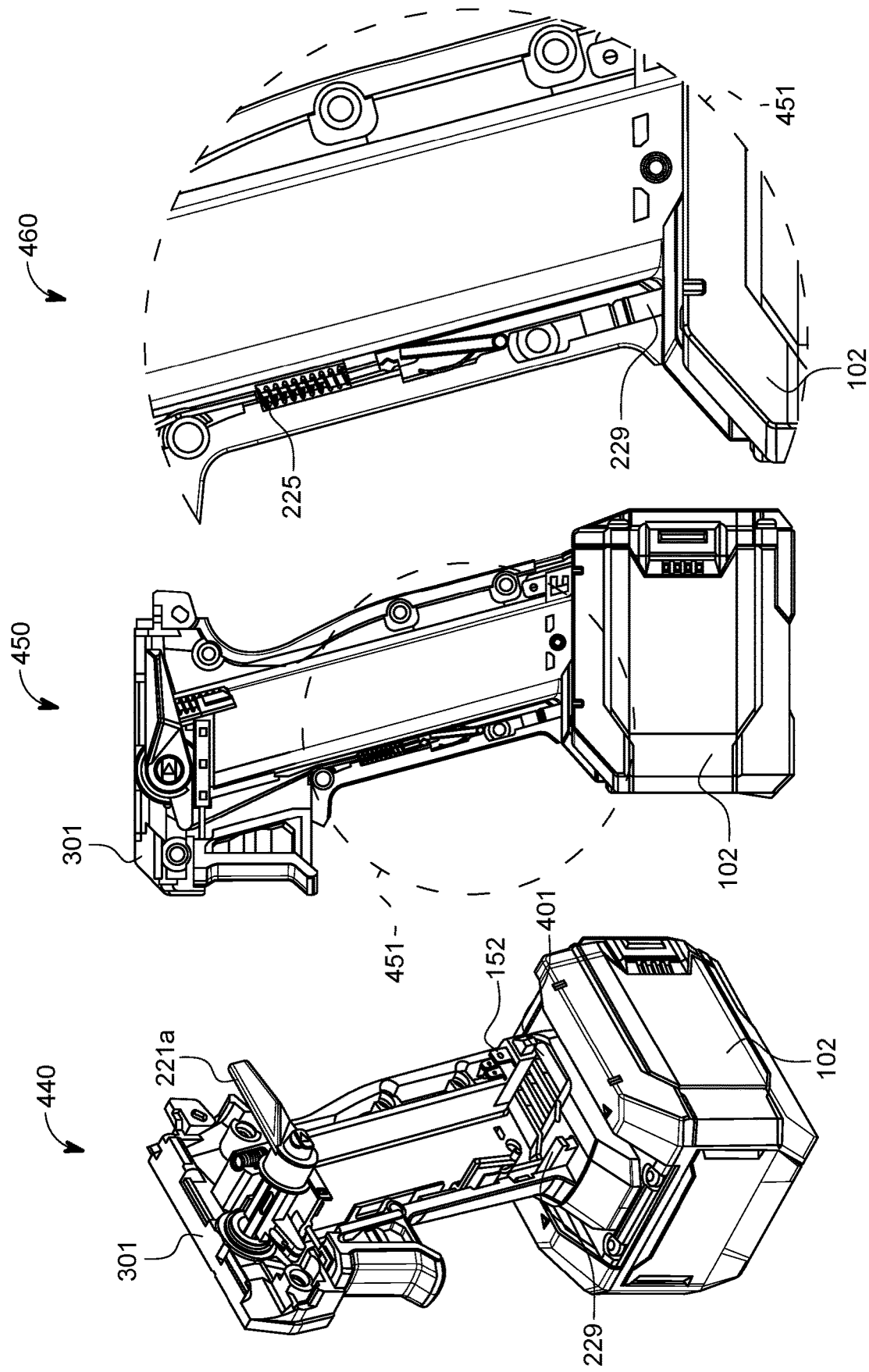

ONE-HANDED POWER-TOOL BATTERY EJECTION APPARATUS

CROSS-REFERENCE(S) TO RELATED APPLICATION(S)

The present application claims the benefit of the filing date of the U.S. Provisional Patent Application 63/437,701, entitled "ONE-HANDED POWER TOOL BATTERY EJECTION APPARATUS," filed on 8 Jan. 2023, the contents of which is hereby expressly incorporated by reference in its entirety, under 35 U.S.C. § 119(e).

TECHNICAL FIELD

The present invention generally relates to power-tools and, more specifically, to a simple release of the battery-pack from the power-tool.

BRIEF DESCRIPTION OF THE DRAWINGS

The drawings, when considered in connection with the following description, are presented for the purpose of facilitating an understanding of the subject matter sought to be protected.

FIG. 3A is a perspective view of an example power-tool handle and a possible placement of a hold-and-release switch and its components, while a magazine-battery enters the handle;

FIG. 3B is a side view of the power-tool handle of FIG. 3A;

FIG. 3C is a close-up view of a part of FIG. 3B;

FIG. 4A is a perspective view of an example power-tool handle and a possible placement of a hold-and-release switch and its components, while a battery-pack slidingly mates with the bottom of the handle;

FIG. 4B is a side view of the power-tool handle of FIG. 4A;

FIG. 4C is a close-up view of a part of FIG. 4B;

FIG. 4D shows the power-tool handle of FIG. 4A with the battery-pack completely mated with the handle;

FIG. 4E is a side view of the power-tool handle of FIG. 4D; and

FIG. 4F is a close-up view of a part of FIG. 4E.

DETAILED DESCRIPTION

While the present disclosure is described with reference to several illustrative embodiments and example devices described herein, it should be clear that the present disclosure should not be limited to such embodiments. Therefore, the description of the embodiments provided herein is illustrative of the present disclosure and should not limit the scope of the disclosure as claimed. In addition, while the following description mostly references a battery-operated hand drill, it will be appreciated that the disclosure may be applicable to other types of battery-operated single-handed power-tools.

Briefly described, devices and mechanisms are disclosed for a simple ejection of a battery-pack from a power-tool with one hand only. These ejection mechanisms primarily use one finger while the same hand of the user is holding the power-tool. The claimed mechanisms enable the power-tool handle to accept both kinds of batteries, depending on the user's preference, and hold and eject either kind of batteries, which are either slidably attached to the bottom of the power-tool or are attached to the inside of the power-tool handle in the form of a magazine.

To activate the release mechanism of the batteries, a rotary actuator, a linear actuator, a rotatable switch, a push-switch, or a lever is conveniently located on the handle of the power-tool such that the user can activate it by, for example, the user's thumb while squeezing the power-tool's ON-OFF switch/trigger with her index finger.

During the time that the battery release switch is not activated, some components of the battery release mechanism, by default and automatically, lock the battery-pack or the magazine-battery to the handle once the power-tool handle is completely mated with either of the battery-pack or the magazine-battery.

Figure 1A:
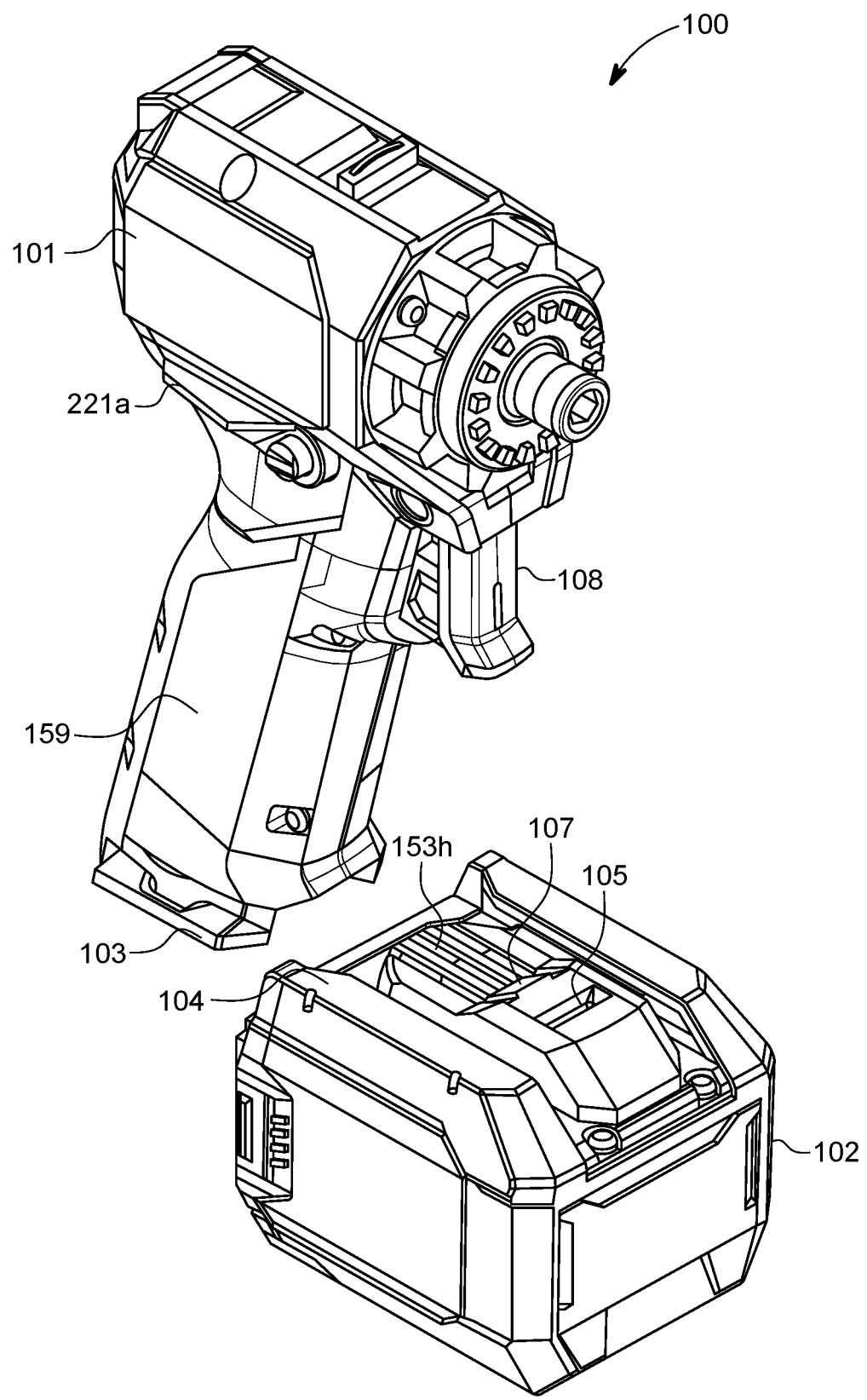
FIG. 1A shows a perspective view of an example power-tool and a slidable battery-pack.

FIG. 1 shows a perspective view 100 of an example power-drill 101 and a slidable battery-pack 102. The power-drill 101 has two strips 103 on both sides of the bottom of its handle 159. Trigger 108 turns the power-tool 101 ON and OFF and optionally controls its speed. The two strips 103 are configured to travel inside the battery-pack rails 104, which are located on the top of the battery-pack 102. The two strips 103 and the battery-pack rails 104 enable the power-drill handle 159 to mechanically mate with and electrically connect to the battery-pack 102. In the mated position, the electrical connectors 153$h$ are in electrical contact with the electrical connectors of handle 159, as will be discussed in detail later, where the "h" of 153$h$ signifies the horizontal movement and engagement of the battery-pack 102 with respect to the handle 159.

Figure 1B:
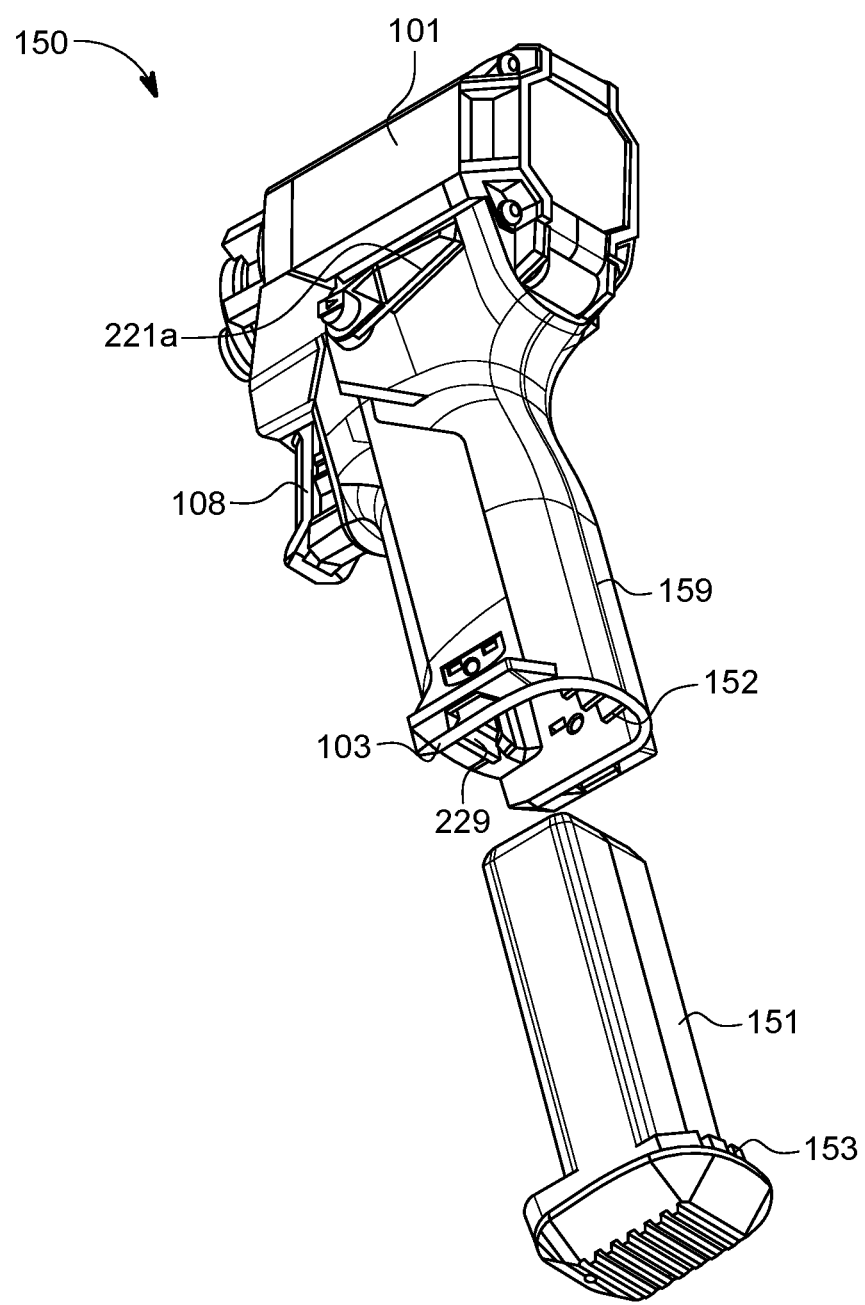
FIG. 1B shows a perspective view of an example power-tool and a magazine-style battery.

For the battery-pack 102 to be locked in position, strips 103 continue traveling within rails 104 until the inclined surface 107 catches and pushes upward the spring-loaded latch-bolt 229 (FIG. 1B). The latch-bolt 229 and the spring 225 (FIG. 2B) are attached to the inside wall of handle 159. After latch-bolt 229 is pushed upward and clears the inclined surface 107, it will fall into the cavity 105 and locks battery-pack 102 in this position. Battery-pack 102 will not be able to move with respect to handle 159 unless the latch-bolt 229 is pulled upward and out of cavity 105 by the user's activation of the battery hold-and-release switch/lever 221$a$.

FIG. 1B shows a perspective view 150 of an example power-drill 101 and a magazine-battery 151. The power-drill 101 has a handle 159, which itself includes electrical connectors 152 that mate with electrical connectors 153$v$ of the magazine-battery 151, where the "v" of 153$v$ signifies the vertical movement and engagement of the magazine-battery 151 with respect to the handle 159. As far as the function of the claimed lock-and-release mechanism is concerned, it resembles the magazines of semi-automatic pistols. With most pistols, the magazine is fed into the handle from the bottom of the handle and is locked in place when the magazine is almost all the way inside the pistol handle. Additionally, most pistols are operated by the right hand of a user, while the thumb of the user can squeeze a small push button on the pistol handle to release the magazine.

Figure 1C:
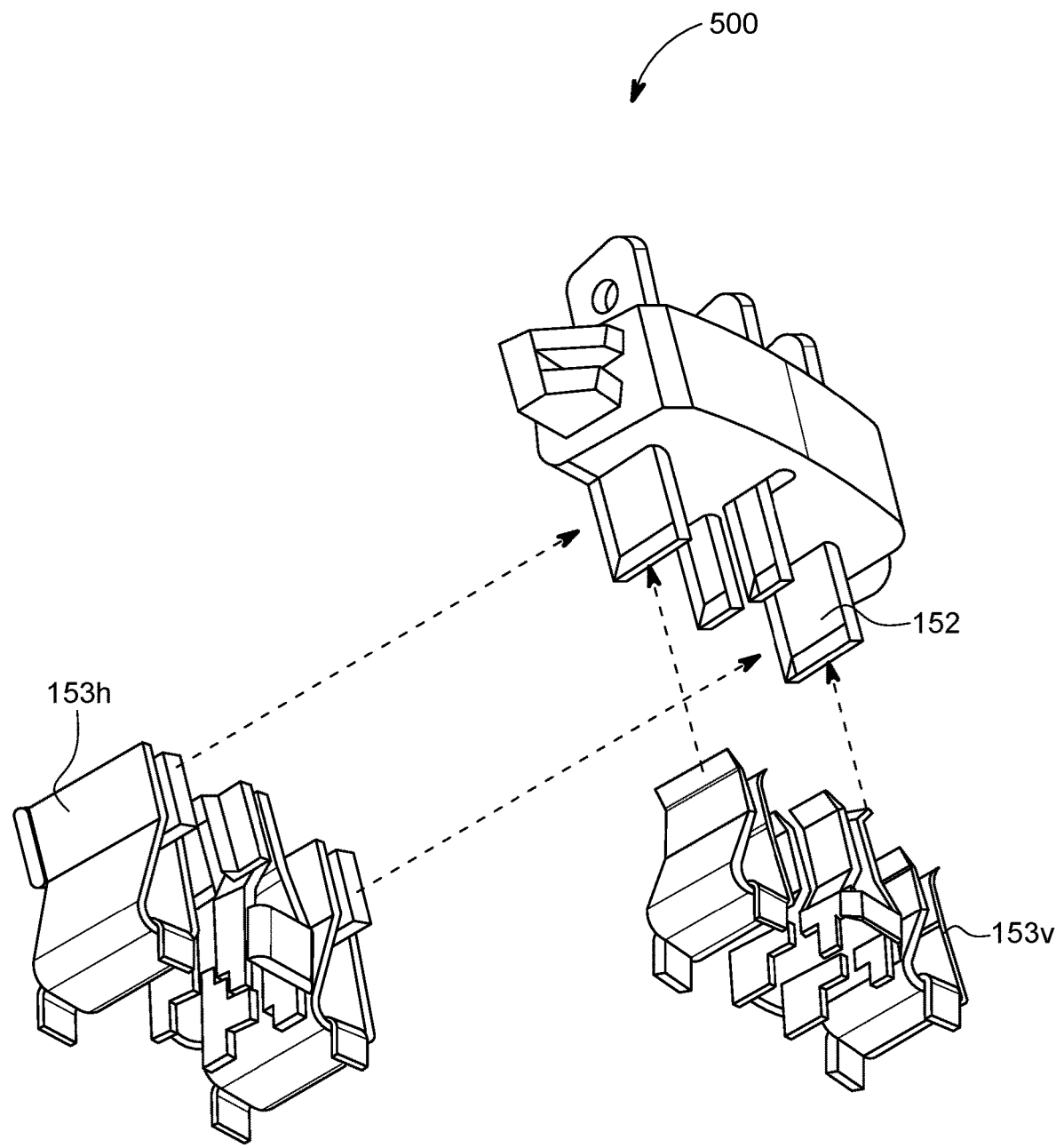
FIG. 1C shows examples of electrical connectors of a battery-pack, a power-tool handle, and a magazine-battery.

FIG. 1C shows examples of electrical connectors of the battery-pack, the power-tool handle, and the magazine-battery. The power-tool handle connectors 152, as shown in the embodiment of FIG. 1B, are almost at the bottom and toward the inner back-side of the handle 159. As is clearly shown in FIG. 1C, the handle connectors 152 can be approached horizontally and be engaged by the electrical connectors 153h of the battery-pack 102 or be approached vertically and be engaged by the electrical connectors 153v of the magazine-battery 153v.

Figure 2A:
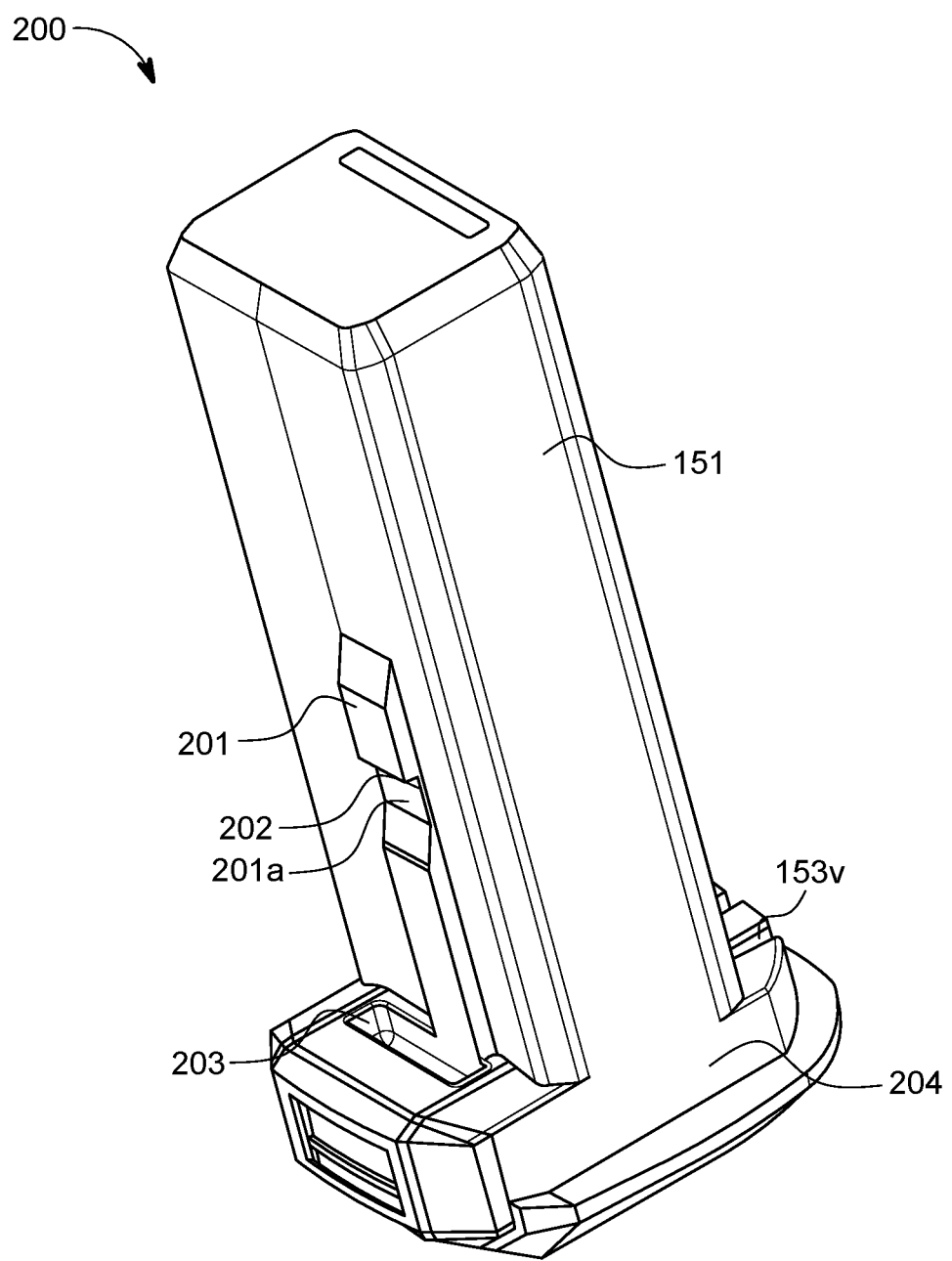
FIG. 2A shows a perspective view of an example magazine-style battery.

FIG. 2A shows a perspective view 200 of the magazine-battery 151, which includes a latch protrusion 201 and a cavity 201a to be utilized for locking the magazine-battery 151 inside the power-drill handle 159. The magazine-battery 151 also includes a base 204 that houses the electrical connectors 153v and forms a cavity 203. This cavity is a space for parking and temporarily storing the latch-bolt 229 when a magazine-battery is used instead of a battery-pack. The magazine latch protrusion 201 and the cavity 201a create a latch ledge 202, which engages a second latch-bolt 227 (FIG. 2B) within the handle 159 when the magazine-battery 151 completely enters inside the handle 159. This engagement is permanent unless and until the battery hold-and-release switch/lever 221a is pressed.

Figure 2B:
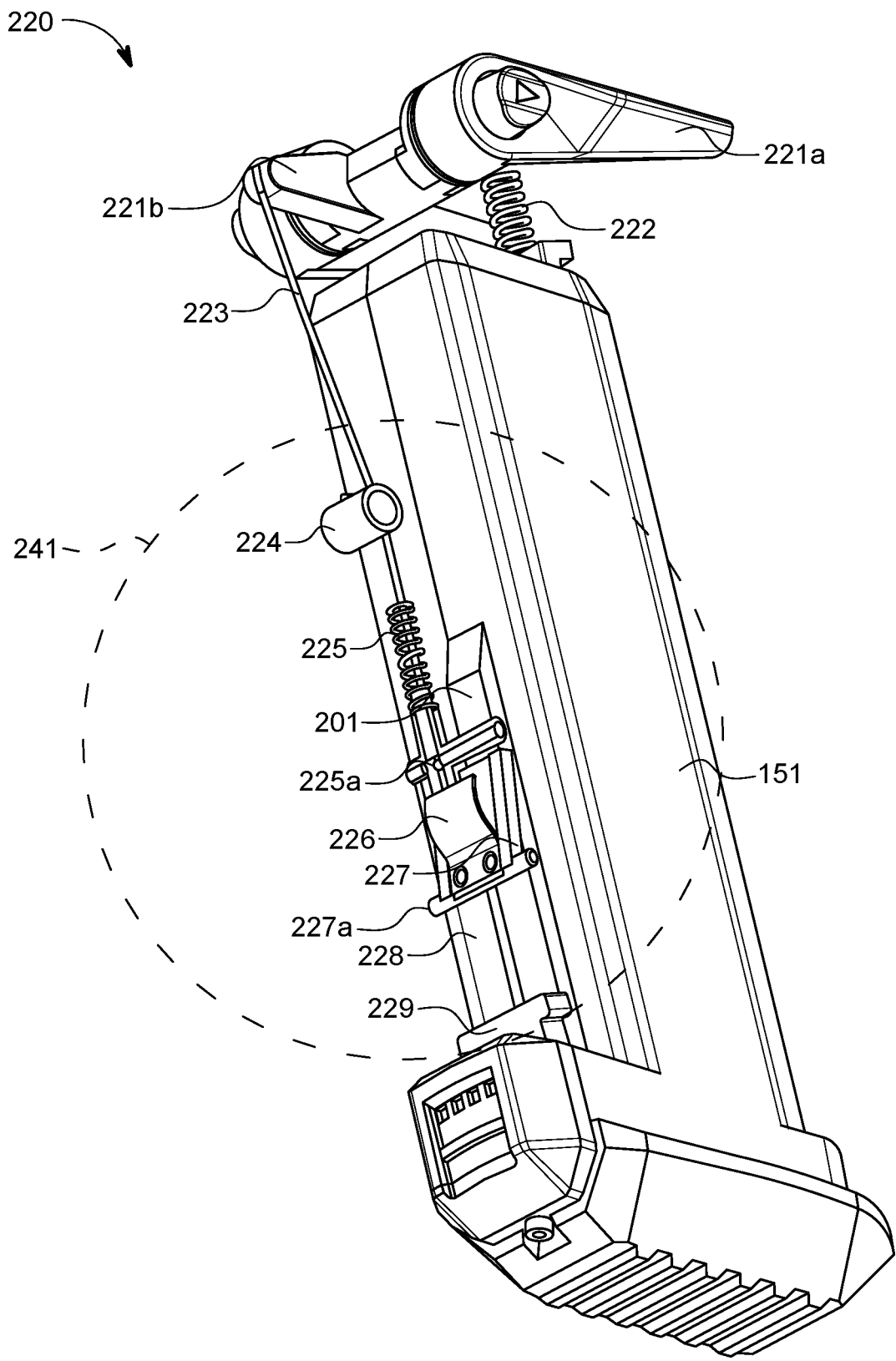
FIG. 2B shows an example of a battery hold-and-release mechanism of a power-tool.

FIG. 2B shows an example combination 220 of the magazine-battery 151 and a battery lock-and-release mechanism. This mechanism is attached to the inside of the frontal wall of the power-tool handle 159. For clarity, the cover of the handle 159 is not shown in FIG. 2B. The lock-and-release switch or lever 221a protrudes outwardly from a point on top of the handle 159. This battery lock-and-release switch or lever 221a is ergonomically placed where the user can conveniently push it with his/her right thumb while holding the handle 159 in his/her right hand.

Pushing the lock-and-release switch/lever 221a causes lever 221b to rotate around the same axis as the lock-and-release switch/lever 221a, and will in turn cause cable 223 to be pulled up and activate other components of the lock-and-release mechanism. Here, roller 224 slightly changes the direction of the cable 223 to be more aligned with the longitudinal axis of the handle 159. The compression spring 225, the top of which is fixed to the handle 159, will be compressed upon activating the lock-and-release switch 221a. If switch 221a is released, spring 225 will expand and will pull back cable 223, reinstating the default position of the lock-and-release switch 221a. In some embodiments, cable 223 may be a piece of material such as a solid or flexible wire or shaft.

As shown in FIG. 2B, the relatively small plate 227 is the second latch-bolt of the lock-and-release system that keeps the magazine-battery 151 inside the handle 159. A leaf spring 226 is permanently attached to the latch-bolt 227. In the embodiment shown in FIG. 2B, the combination of latch-bolt 227 and leaf spring 226 is permanently attached to shaft 227a, which is rotatably hinged to the inside wall of handle 159. The combination of the latch-bolt 227 and the leaf spring 226 revolves around the longitudinal axis of shaft 227a, and the axis of shaft 227a is approximately perpendicular to the longitudinal axis of handle 159. With this arrangement, the leaf spring 226 constantly pushes the latch-bolt 227 toward the magazine-battery 151.

At some point after the magazine-battery 151 enters the handle 159, the free edge of the latch-bolt 227, which is somewhat parallel to the shaft 227a, starts to ride over the latch protrusion 201 and eventually falls into the cavity 201a and will engage the ridge 202. This will prevent the magazine-battery 151 from reversing direction and being pulled out of the handle 159.

To retract the latch-bolt 227 and release the magazine-battery 151, the battery lock-and-release lever 221a must be activated/pushed. This will pull up cable 223 and in turn will push the latch-bolt 227 toward the inside wall of the handle 159. The retraction of latch-bolt 227 will disengage the latch-bolt 227a from the ridge 202, and magazine-battery 151 will slide out of the handle 159. After the user releases lever 221a, the compression spring 225 will pull the cable 223 back/down, and the latch-bolt 227 and switch 221a will move to their default positions.

Figure 2C:
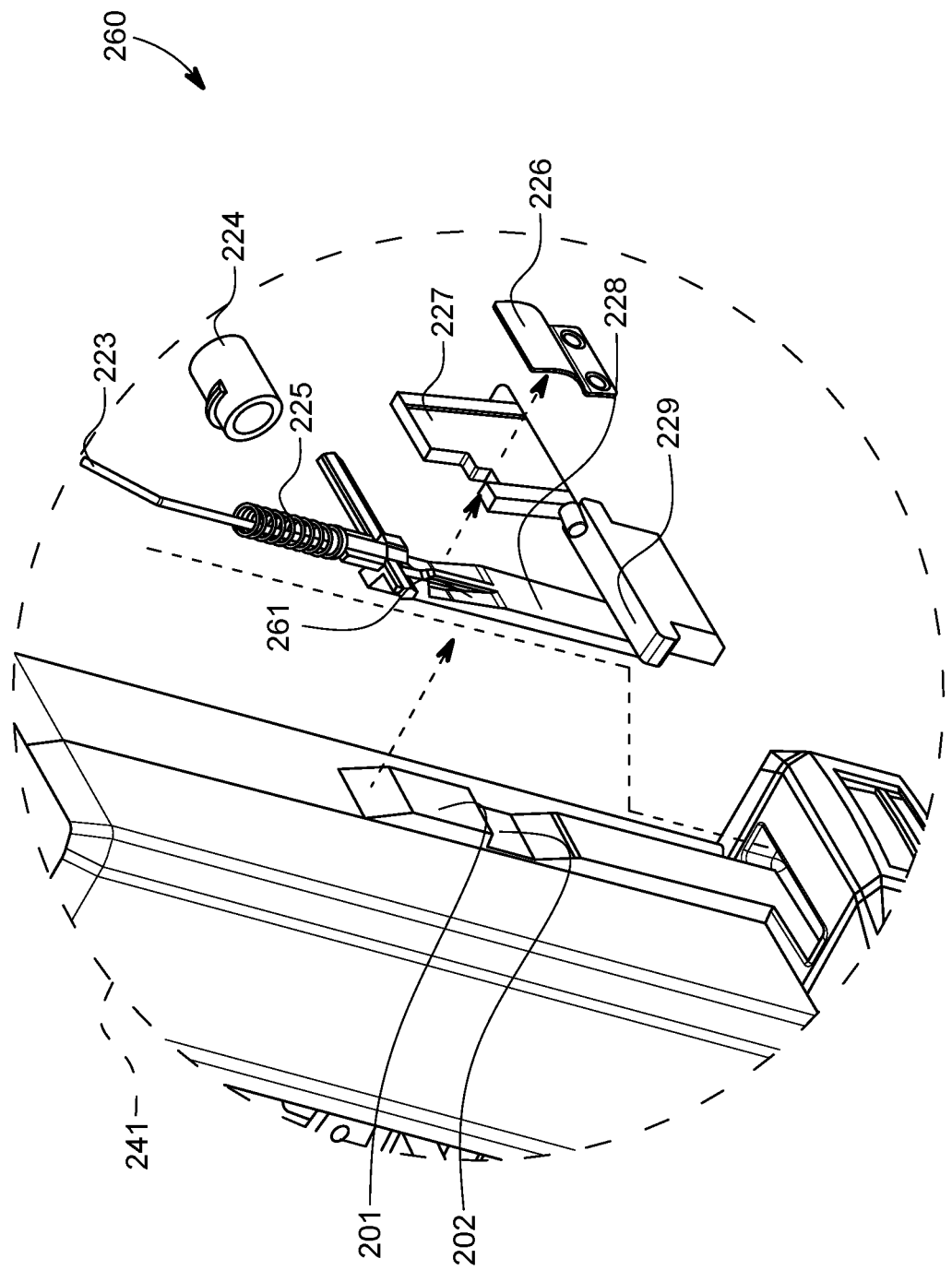
FIG. 2C shows the exploded view of the battery hold-and-release mechanism illustrated in FIG. 2B.

FIG. 2C is an exploded view 260 of area 241 of FIG. 2B, and the mechanism represented by the components in FIG. 2C is responsible for locking and unlocking the magazine-battery 151 inside handle 159. As will be described later in more detail, plate or strip 228, which is responsible for retracting latch-bolt 227 from its locked or latched position, is attached to the cable 223 from one side and to the (second) latch-bolt 229 from the other side. When cable 223 is pulled up by activating lever 221a, plate 228 will move up, pushing the latch-bolt 227 toward the handle wall and releasing it from its locked position. The upward movement of plate 228 will also pull up latch-bolt 229, which is used to lock and unlock the battery-pack 102 to and from the handle 159. In various embodiments, the combination of the latch-bolt 229, plate 228, and the connector 225a to the cable 223 may be one solid piece of material.

Figure 2D:
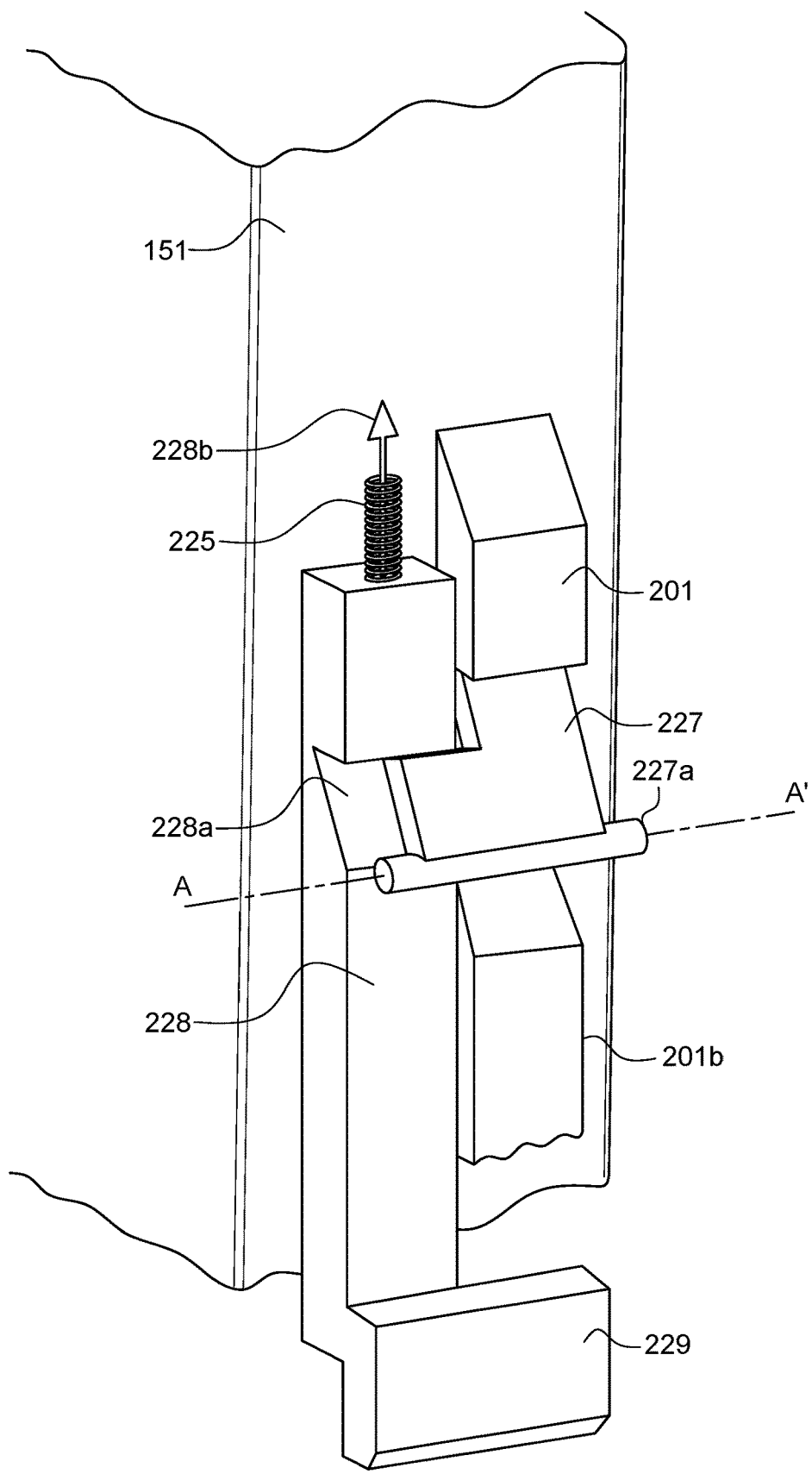
FIG. 2D is a simplified illustration of the battery hold-and-release mechanism of FIG. 2C.

FIG. 2D is a simplified illustration of the battery lock-and-release mechanism shown in FIG. 2B. In FIG. 2D the latch protrusion 201, the cavity 201a, and the continuation of the strip forming the latch protrusion 201 are parts of the outside surface of magazine-battery 151. All other components shown in FIG. 2D are attached to the inside surface of the front wall of handle 159. Shaft 227a, as mentioned before, is hinged to the wall of handle 159 and, along with the latch-bolt 227, can only rotate around the longitudinal axis A-A'. As magazine-battery 151 is pushed upward inside handle 159, the inclined protrusion 201 will push away the latch-bolt 227, toward the handle wall. Upon further upward movement of magazine-battery 151, the latch-bolt 227 will be pushed back by leaf-spring 226 (shown in FIG. 2B) into the cavity 201a. A portion of latch-bolt 227 will also be pushed into the sloped depression 228a of plate/strip 228, which is situated side by side strip 201b. This is the default position for strip 228 when the lock-and-release switch 221a is not pressed. In this configuration, magazine-battery 151 cannot move down and out of handle 159.

To unlock and release magazine-battery 151, the switch 221a is activated by the user's thumb. Simultaneously, cable 223 and strip 228 are pulled in the direction 228b. The movement of strip 228 in the direction of 228b causes the inclined surface of the sloped depression 228a to push the latch-bolt 227 toward the handle wall and out of the sloped depression 228a, which also results in pushing the latch-bolt 227 out of cavity 201a. This allows the magazine-battery 151 to drop down and out of handle 159. At the same time, the movement of strip 228 in the direction 228b moves the latch-bolt 229 in the same direction 228b, which unlocks the battery-pack 102, if this kind of battery is attached to the handle 159 instead of a magazine-battery.

During the unlocking and release time, switch 221*a* remains pressed and the coil spring 225 is compressed; however, after the release of the battery and subsequent release of switch 221*a*, the coil spring 225 pushes the strip 228 to its default position along with switch 221*a*, latch-bolt 227, and latch-bolt 229.

FIG. 3A shows a perspective view of a combination 300 of the power-tool handle 159 and the magazine-battery 151. In this illustration, some internal parts of handle 159, which facilitate the locking and unlocking of a battery, are shown. In FIG. 3A, the magazine-battery 151 is partially inside handle 159 of the power-tool 101. As shown in this figure, a final push upward will connect the magazine-battery connectors 153*v* to the handle connectors 152. In FIG. 3A, surface 301 is the top surface of handle 159, and the handle cover 302 encloses the lock-and-release system within the handle 159 and forms the outside appearance of the handle 159. FIG. 3B is the side view 320 of the combination 300 of FIG. 3A.

FIG. 3C is the magnified view 330 of area 323 of FIG. 3B, which focusses on the lock-and-release mechanism, the exploded view of which is shown in FIG. 2C. As seen in FIGS. 3B and 3C, the protrusion 321 fixes one end of spring 225 to the handle wall.

Figure 3D:
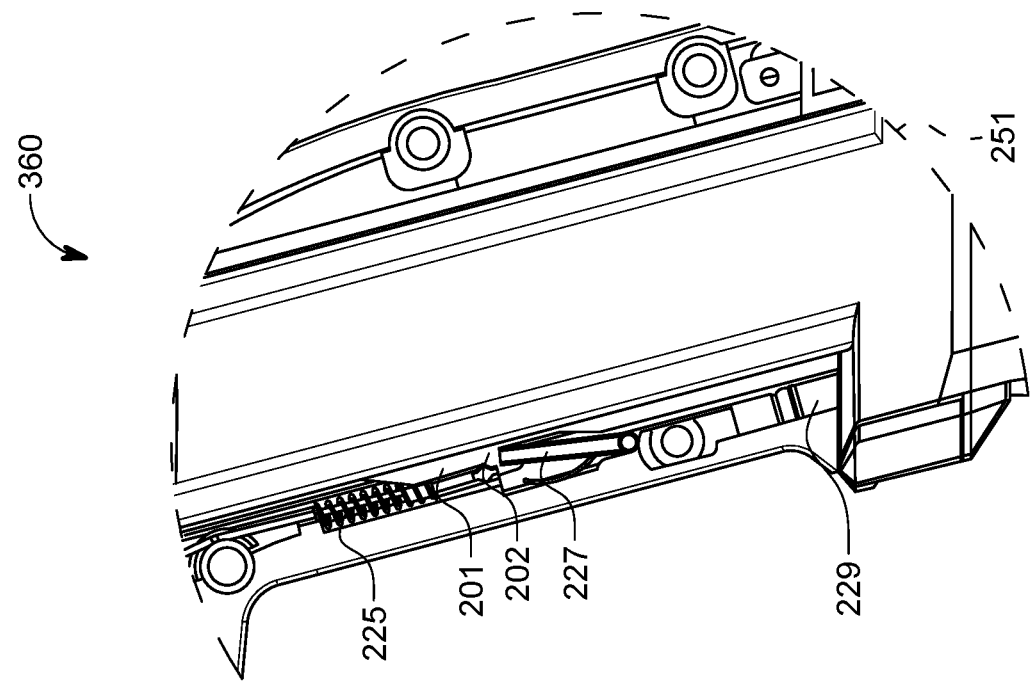
FIG. 3D shows the power-tool handle of FIG. 3A with the magazine-battery completely within the handle.

FIG. 3D shows another perspective view of a combination 340 of the power-tool handle 159 and the magazine-battery 151. In this illustration, which is similar to FIG. 3A, the magazine-battery 151 is completely inside the handle 159. And the magazine-battery connectors 153*v* are positively connected to the handle connectors 152.

Figure 3E:
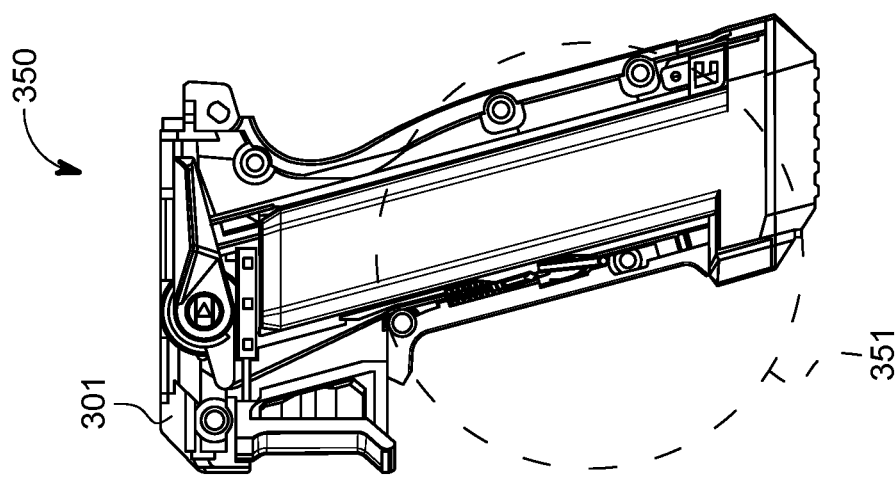
FIG. 3E is a side view of the power-tool handle of FIG. 3D.
Figure 3F:
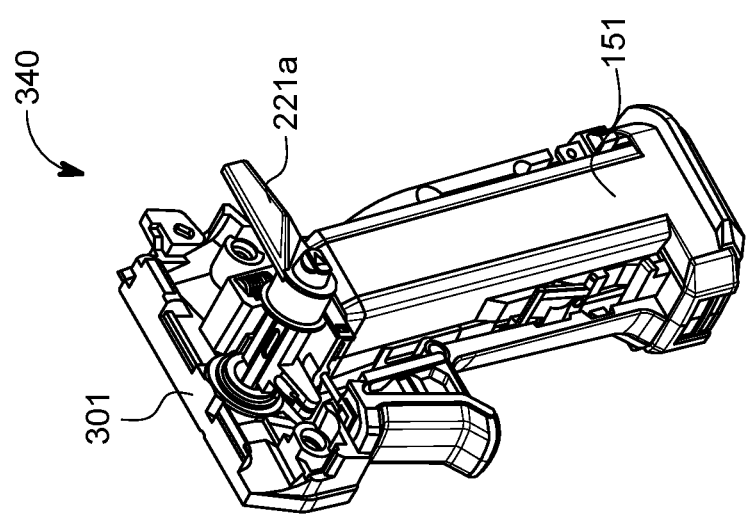
FIG. 3F is a close-up view of a part of FIG. 3E.

FIG. 3E is the side view 350 of the combination 340 of FIG. 3D. FIG. 3F is the magnified view 360 of area 351 of FIG. 3E, which focuses on the lock-and-release mechanism, the exploded view of which is shown in FIG. 2C.

FIG. 4A shows a perspective view of a combination 400 of the power-tool handle 159 and the battery-pack 102. In this illustration, some internal parts of handle 159, which facilitate the locking and unlocking of a battery, are shown. In this figure, the battery-pack 102 is partially attached to handle 159 of the power-tool 101, but it is not locked in place yet. As shown in this figure, a final horizontal push will connect the magazine-battery connectors 153*h* to the handle connectors 152. FIG. 4B is the side view 420 of the combination 400 of FIG. 4A.

FIG. 4C is the magnified view 430 of area 421 of FIG. 4B, which focusses on the lock-and-release mechanism, the exploded view of which is shown in FIG. 2C.

FIG. 4D shows another perspective view of the combination 440 of the power-tool handle 159 and the battery-pack 102. In this illustration, which is similar to FIG. 4A, the battery-pack 102 is completely attached and locked to the handle 159. And the battery-pack connectors 153*h* are positively connected to the handle connectors 152. FIG. 4E is the side view 450 of the combination 440 of FIG. 4D.

FIG. 4F is the magnified view 460 of area 451 of FIG. 4E, which focuses on the lock-and-release mechanism, the exploded view of which is shown in FIG. 2C.

It will be understood that unless explicitly stated or specified, the steps described in a process are not ordered and may not necessarily be performed or occur in the order described or depicted. For example, step A in a process described prior to step B in the same process may actually be performed after step B. In other words, a collection of steps in a process for achieving an end result may occur in any order unless otherwise stated.

Changes can be made to the claimed invention in light of the above Detailed Description. While the above description details certain embodiments of the invention and describes the best mode contemplated, no matter how detailed the above appears in text, the claimed invention can be practiced in many ways. Details of the system may vary considerably in its implementation details, while still being encompassed by the claimed invention disclosed herein.

Particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the claimed invention to the specific embodiments disclosed in the specification, unless the above Detailed Description section explicitly defines such terms. Accordingly, the actual scope of the claimed invention encompasses not only the disclosed embodiments, but also all equivalent ways of practicing or implementing the claimed invention.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." It is further understood that any phrase of the form "A/B" shall mean any one of "A", "B", "A or B", or "A and B". This construct includes the phrase "and/or" itself.

The above specification, examples, and data provide a complete description of the manufacture and use of the claimed invention. Since many embodiments of the claimed invention can be made without departing from the spirit and scope of the disclosure, the invention resides in the claims hereinafter appended. It is further understood that this disclosure is not limited to the disclosed embodiments, but is intended to cover various arrangements included within the spirit and scope of the broadest interpretation so as to encompass all such modifications and equivalent arrangements.

What is claimed is:

1. A power-tool handle for electrically and mechanically connecting to two types of battery, wherein the handle comprises:
    a battery lock-and-release mechanism, including:
        a first latch for locking and unlocking a first type of battery useable with the power-tool, wherein the first type of batter magazine battery which is fully and vertically inserted into the power tool handle;
        a second latch for locking and unlocking a second type of battery useable with the power-tool, wherein the second type of battery is a horizontally slidable battery pack which remains fully outside the power handle; and
        wherein both types of battery connect to same set of connectors.

2. The power tool handle of claim 1, wherein one type of battery connects with the connectors in a horizontal direction with respect to the handle, and the other type of battery connects with the electrical connectors in a vertical direction with respect to the handle.

3. The power tool handle of claim 1, wherein the set of electrical connectors is configured to be approached from to mutually perpendicular directions.

4. The power tool handle of claim 1, wherein the battery lock and release mechanism has a release switch or actuator that is linear or rotary.

5. The power tool handle of claim 1, wherein the first latch has a bolt that is hinged to an inside wall of the handle and is biased by a spring toward the magazine-battery.

6. The ower tool handle of claim 5, wherein the magazine-battery includes a sloped protrusion that pushes away the first latch-bolt while traveling inside the handle and is locked in place by the first latch-bolt after the magazine-battery is inside the handle and the first latch-bolt is engaged with a non-sloped surface of the protrusion.

7. The power tool handle of claim 6, wherein the battery release switch, upon activation, moves a wedge that pushes back the first latch-bolt toward the handle wall and disengages the first latch-bolt from the magazine-battery protrusion and releases the magazine-battery.

8. The power tool handle of claim 7, wherein the battery release switch, upon activation, moves the wedge by a linkage or by a cable or by a combination of a linkage and a cable.

9. The ower tool handle of claim 8, wherein the second latch has a bolt that is spring-loaded and enters into a cavity of the battery-pack upon slidably attaching the battery-pack to the power-tool handle, and locks the battery-pack to the handle, and wherein the second latch-bolt retracts and releases the battery-pack from the handle upon activation of the battery release switch and the linkage.

10. The power tool handle of claim 1, wherein the handle is held by one hand, and wherein the hand's index-finger squeezes a power-tool trigger to turn the power-tool On and OFF and to control a speed of the power-tool, and wherein the hand's thumb is employed to release both types of batteries.

11. A power-tool having a handle that accepts two types of, a magazine battery and a slidable battery pack, and is operated by a single hand of a user, wherein the power-tool comprises:
    a first latch for automatically locking and manually unlocking the magazine-battery;
    a second latch for automatically locking and manually unlocking the slidable battery-pack; and
    a single battery release switch or actuator on the handle for activating both latches of battery release mechanisms and releasing any battery attached to the handle, wherein the release switch is activated by a finger of a same hand that operates the power tool without a need to leave its operating position.

12. The power-tool of claim 11, wherein the battery-pack slidably attaches to a free end of the handle on two rails and wherein the magazine-battery slidably travels inside the handle.

13. The power-tool of claim 11, further comprising a single set of electrical connectors that accepts connection from two perpendicular directions.

14. The power-tool of claim 13, wherein the single set of electrical connectors are designed to mechanically engage with and electrically connect to magazine-battery connectors in a longitudinal direction of the handle or to battery-pack connectors in a latitudinal direction of the handle.

15. The power-tool of claim 11, wherein the handle is held by one hand of the user, and wherein index-finger of the user squeezes a power-tool trigger to turn the power-tool On and OFF and to control a speed of the power-tool, and wherein the user's thumb activates the battery release switch to release the battery unit.

16. The power-tool of claim 11, wherein the magazine-battery is locked to an inside wall of the handle by the first latch-bolt that is pushed away by a spring from the handle wall toward the magazine-battery.

17. The power-tool of claim 16, wherein the magazine-battery includes an inclined protrusion that pushes away the first latch-bolt while being inserted inside the handle and is locked in place by the first latch-bolt after the magazine-battery is inside the handle and the first latch-bolt is positively engaged by a non-inclined surface of the protrusion.

18. The power-tool of claim 17, wherein the battery release lever, upon activation, moves a wedge that pushes back the first latch-bolt toward the handle wall and disengages the first latch-bolt from the magazine-battery protrusion and releases the magazine-battery.

19. The power-tool of claim 18, wherein the battery release switch or actuator, upon activation, moves the wedge by a linkage.

20. The power-tool of claim 19, wherein the linkage also includes a second latch-bolt that is spring-loaded falls into a cavity of the battery-pack upon slidably attaching the battery-pack to the power-tool handle and locks the battery-pack to the handle, and wherein the second latch-bolt retracts and releases the battery-pack from the handle upon activation of the battery release switch and the linkage.

* * * * *